(12) United States Patent
Park

(10) Patent No.: US 9,622,111 B2
(45) Date of Patent: *Apr. 11, 2017

(54) METHODS AND ARRANGEMENTS FOR TRAFFIC INDICATION MAP SEGMENTATION IN WIRELESS NETWORKS

(71) Applicant: Intel Corporation, Santa Clara, CA (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/129,971

(22) PCT Filed: Jun. 29, 2013

(86) PCT No.: PCT/US2013/048808
§ 371 (c)(1),
(2) Date: Dec. 28, 2013

(87) PCT Pub. No.: WO2014/011421
PCT Pub. Date: Jan. 16, 2014

(65) Prior Publication Data
US 2015/0036497 A1    Feb. 5, 2015
US 2016/0157128 A9    Jun. 2, 2016

Related U.S. Application Data

(63) Continuation of application No. 13/730,988, filed on Dec. 29, 2012, now Pat. No. 9,237,481.

(Continued)

(51) Int. Cl.
*H04W 28/06* (2009.01)
*H04W 68/02* (2009.01)
*H04W 76/04* (2009.01)

(52) U.S. Cl.
CPC ....... *H04W 28/065* (2013.01); *H04W 68/025* (2013.01); *H04W 76/048* (2013.01)

(58) Field of Classification Search
None
See application file for complete search history.

(56) References Cited

U.S. PATENT DOCUMENTS 7,424,007 B2 *  9/2008  Meier ............ H04W 4/06
                                                    370/311
8,068,447 B2 * 11/2011  Meier ............ H04W 4/06
                                                    370/311

(Continued)

FOREIGN PATENT DOCUMENTS

JP    2015529024         10/2015
WO   2013187649         12/2013
WO   2014/011421 A1    1/2014

OTHER PUBLICATIONS

International Search Report and Written Opinion received for Patent Application No. PCT/US2013/048808 mailed on Oct. 18, 2013, 10 pages.

(Continued)

*Primary Examiner* — Michael Thier
*Assistant Examiner* — Eric Nowlin
(74) *Attorney, Agent, or Firm* — Shichrur & Co.

(57) ABSTRACT

Logic may implement a hierarchical data structure for traffic indication mapping (TIM) and segment the TIM into TIM segment bitmaps to facilitate transmissions for wireless communications devices. The traffic indication provides information as to whether a device associated with an access point (AP) has data buffered by the AP. Logic of the AP may inform devices about the range of devices represented by each of the TIM segments by including a block start and block range or a TIM segment index that can be associated with a range of blocks. Logic may provide at least one page (Continued)

bitmap to devices for the TIM segment bitmaps to provide an indication to the devices as to whether a particular block includes an indication that any client devices have data buffered by the access point.

31 Claims, 11 Drawing Sheets

Related U.S. Application Data

(60) Provisional application No. 61/669,498, filed on Jul. 9, 2012.

(56) References Cited

U.S. PATENT DOCUMENTS

| | | | | |
|---|---|---|---|---|
| 8,223,662 | B2* | 7/2012 | Deshpande | H04W 52/0216 370/252 |
| 8,514,763 | B2* | 8/2013 | Liu | H04L 1/1614 370/312 |
| 8,934,390 | B2* | 1/2015 | Chu | H04W 52/0216 370/252 |
| 9,060,349 | B2* | 6/2015 | Seok | H04W 74/08 |
| 9,144,072 | B2* | 9/2015 | Park | H04W 74/04 |
| 9,226,240 | B2* | 12/2015 | Gong | G06F 1/3209 |
| 9,374,782 | B2* | 6/2016 | Liu | H04W 52/0216 |
| 2005/0213534 | A1* | 9/2005 | Benveniste | H04W 48/08 370/328 |
| 2009/0016306 | A1* | 1/2009 | Wang | H04W 74/006 370/338 |
| 2009/0052362 | A1* | 2/2009 | Meier | H04W 4/06 370/311 |
| 2010/0189021 | A1* | 7/2010 | He | H04W 52/00 370/311 |
| 2010/0265864 | A1* | 10/2010 | He | H04W 68/025 370/311 |
| 2011/0038291 | A1 | 2/2011 | Seok | |
| 2012/0120892 | A1 | 5/2012 | Freda et al. | |
| 2013/0223306 | A1 | 8/2013 | Jin et al. | |
| 2013/0229959 | A1 | 9/2013 | Ghosh et al. | |
| 2013/0250833 | A1* | 9/2013 | Kim | H04W 52/0206 370/311 |
| 2013/0272137 | A1* | 10/2013 | Kwon | H04W 72/042 370/241 |
| 2013/0294261 | A1* | 11/2013 | Ghosh | H04W 28/14 370/252 |
| 2013/0294427 | A1 | 11/2013 | Kim et al. | |
| 2013/0301605 | A1* | 11/2013 | Kim | H04L 1/00 370/330 |
| 2013/0329620 | A1* | 12/2013 | Kim | H04W 52/0229 370/311 |
| 2014/0010152 | A1* | 1/2014 | Park | H04W 28/065 370/328 |
| 2014/0146678 | A1* | 5/2014 | Merlin | H04L 47/12 370/235 |
| 2014/0153469 | A1* | 6/2014 | Park | H04W 52/0216 370/311 |
| 2014/0198723 | A1* | 7/2014 | Gong | H04W 74/006 370/328 |
| 2014/0219147 | A1* | 8/2014 | Yenganti | H04W 52/0206 370/311 |
| 2014/0321348 | A1* | 10/2014 | Wentink | H04W 68/02 370/311 |
| 2014/0328238 | A1* | 11/2014 | Seok | H04W 74/04 370/311 |
| 2014/0334368 | A1* | 11/2014 | Zhou | H04W 48/12 370/311 |
| 2015/0023236 | A1* | 1/2015 | Choi | H04W 52/0225 370/311 |
| 2015/0029933 | A1* | 1/2015 | Park | H04W 68/005 370/328 |
| 2015/0063232 | A1* | 3/2015 | Choi | H04W 72/1289 370/329 |
| 2015/0071211 | A1* | 3/2015 | Seok | H04W 74/04 370/329 |
| 2015/0085780 | A1* | 3/2015 | Kim | H04W 52/0216 370/329 |
| 2015/0092763 | A1* | 4/2015 | Kim | H04W 52/0216 370/338 |
| 2015/0103727 | A1* | 4/2015 | Zhang | H04L 12/1854 370/312 |
| 2015/0131570 | A1* | 5/2015 | Kwon | H04W 74/002 370/329 |
| 2015/0230244 | A1* | 8/2015 | Choi | H04L 1/1614 370/329 |
| 2015/0296532 | A1* | 10/2015 | Zhou | H04W 52/0216 370/329 |
| 2015/0312753 | A1* | 10/2015 | Asterjadhi | H04W 4/06 370/329 |
| 2015/0327262 | A1* | 11/2015 | Kwon | H04W 72/0446 370/329 |
| 2015/0365885 | A1* | 12/2015 | Yang | H04W 4/06 370/312 |
| 2016/0080954 | A1* | 3/2016 | Hedayat | H04B 17/318 370/252 |
| 2016/0150557 | A1* | 5/2016 | Lee | H04W 72/1257 370/338 |

OTHER PUBLICATIONS

Wang et al., "TIM Compression", doc.: IEEE 802.11-12/0370r2, Mar. 11, 2012, 21 pages.
Park, "Proposed Specification Framework for TGah", doc.: IEEE 802.11-11/1137r9, May 17, 2012, 20 pages.
Park et al., "TGah Efficient Tim Encoding", doc.: IEEE 802.11-12/388r2, May 14, 2012, 32 pages.
Park et al., "TGah TIM Operation", doc.: IEEE 802.11-12/117r0, Jan. 16, 2012, 10 pages.
Jin et al., "TIM Enhancement With Group Bits", doc.: IEEE 802.11-12/0325r0, Mar. 12, 2012, 10 pages.
International Preliminary Report on Patentability and Written Opinion received for PCT Patent Application No. PCT/US2013/048808, mailed on Jan. 22, 2015, 7 pages.
IEEE Std 802.11TM—2012, (Revision of IEEE Std 802.11—2007), IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Mar. 29, 2012, 2793 pages, IEEE, New York, NY, USA.
Office Action for Japanese Patent Application No. 2015-520608, mailed on Jan. 5, 2016, 4 pages (including 2 pages of English translation).
Office Action for European Patent Application Serial No. 13816324.1, mailed on Feb. 26, 2016, 4 pages.
Extended European Search Report for European Application Serial No. 13816324.1, mailed on Jun. 3, 2016, 7 pages.

* cited by examiner

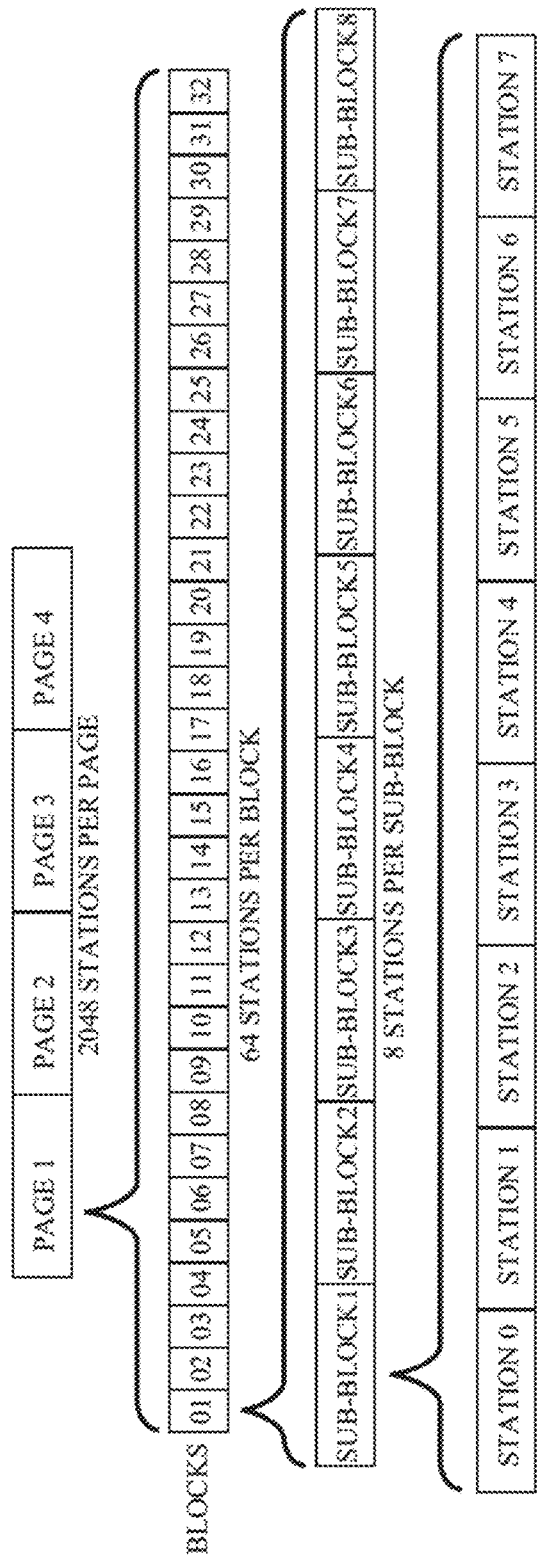
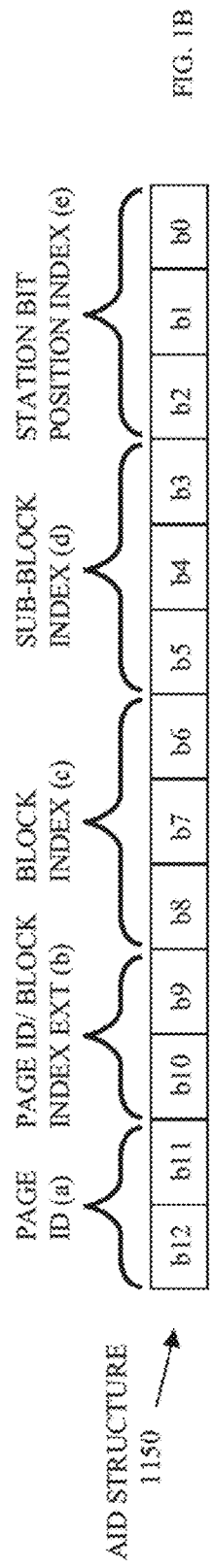
FIG. 1A
FIG. 1B
$AID = (((a * 4 + (b-1)) * 8 + (c-1)) * 8 + (d-1)) * 8 + e$

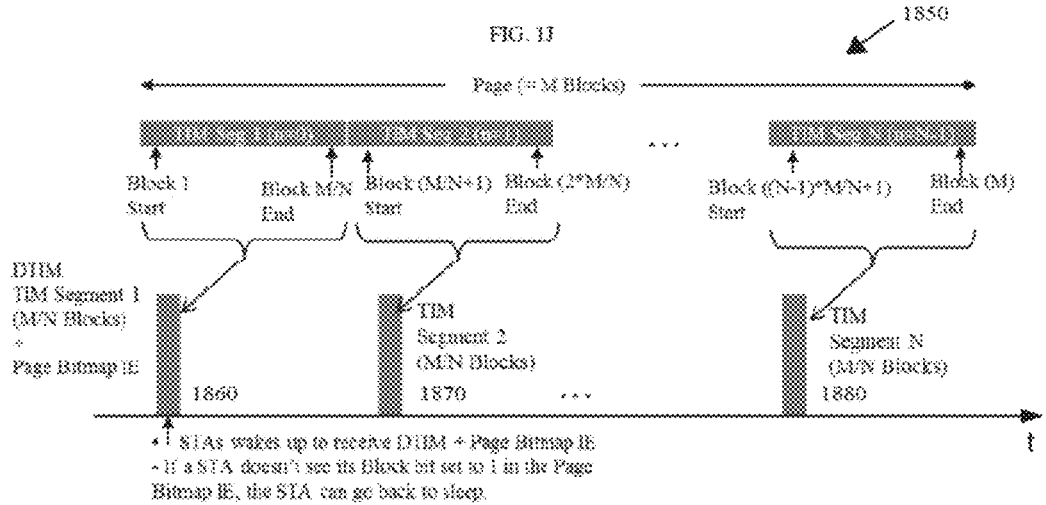

METHODS AND ARRANGEMENTS FOR TRAFFIC INDICATION MAP SEGMENTATION IN WIRELESS NETWORKS

BACKGROUND

Embodiments are in the field of wireless communications. More particularly, the present disclosure relates to segment a hierarchical data structure of a traffic indication map.

BRIEF DESCRIPTION OF THE DRAWINGS

FIG. 1A depicts an embodiment of a hierarchical data structure for traffic indication mapping (TIM) with four pages and 32 blocks per page;

FIG. 1B depicts an embodiment of an association identifier structure for the hierarchical data structure illustrated in FIG. 1A;

FIGS. 1H-J depict another embodiment of a scheme of TIM segmentation and transmission;

DETAILED DESCRIPTION OF EMBODIMENTS

Figure 1:
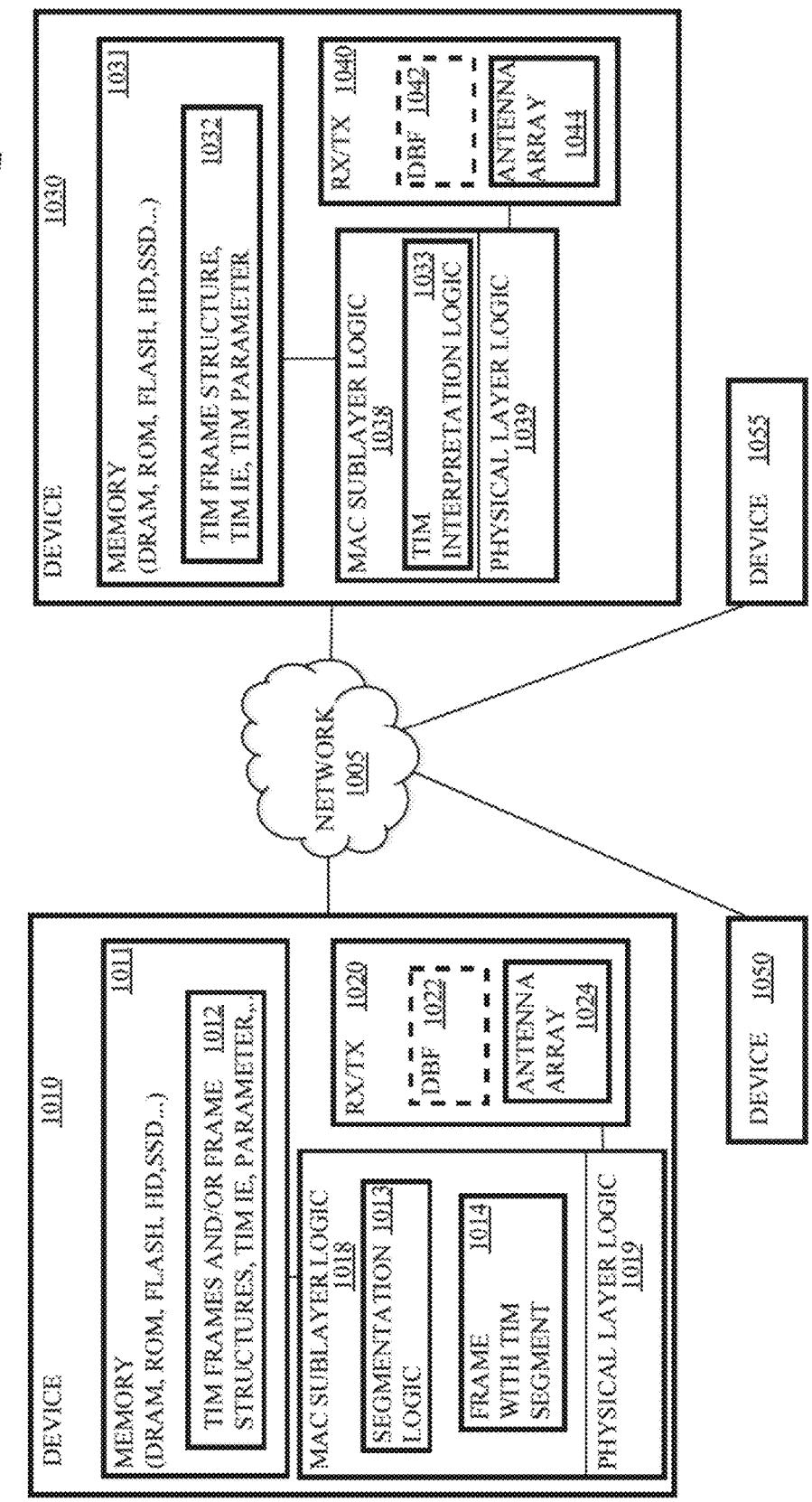
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement a hierarchical data structure for traffic indication mapping (TIM) and segment the TIM into TIM segment bitmaps, also referred to as partial virtual bitmaps, to facilitate transmissions for wireless communications devices. The traffic indication is whether a client device associated with an access point has data buffered by the access point. In many embodiments, the access point may inform client devices about the range of client devices represented by each of the TIM segment bitmaps by including a block start and block range or a TIM segment index that can be associated with a range of blocks. In several embodiments, at least one page bitmap is provided for the TIM segment bitmaps to provide an indication to the client devices as to whether a particular block includes an indication that any client devices have data buffered by the access point.

Many embodiments generate and transmit a frame to the client devices that comprise a TIM segment bitmap in a TIM information element (IE). In several embodiments, the frame is a beacon frame and the TIM IE comprises the block start and block range values. In some embodiments, the frame may also comprise a page bitmap IE comprising the page bitmap. In further embodiments, the TIM IE comprises a page bitmap value in a page bitmap field.

Many embodiments generate a group of TIM segment bitmaps covering one page of the TIM and transmit the TIM segment bitmaps for the one page over a number of beacon intervals. In some embodiments, the beacon interval for one page may be referred to as a delivery traffic indication message (DTIM) beacon interval and the DTIM TIM segments can be identified by the DTIM count field value being equal to zero or the first DTIM beacon in the series. In other embodiments, the DTIM beacon interval may cover all or more than one pages of the TIM.

In several embodiments, the DTIM beacons comprise the page bitmap covering all blocks in the DTIM beacon interval such as all the blocks in the page associated with the DTIM beacon interval. The client devices can parse this page bitmap to determine if the block associated with that client device might have a bit set or whether no client devices associated with the block have a bit set indicating that data is buffered by the access point. If the client device determines that no stations within the block associated with the device have a bit set, the client device does not need to receive any of the TIM segment bitmaps during the DTIM beacon interval.

Various embodiments may be designed to address different technical problems associated with communicating a traffic indication map for a large number of devices. For instance, some embodiments may be designed to address one or more technical problems such as communicating the content of the traffic indication map.

Different technical problems such as those discussed above may be addressed by one or more different embodiments. For instance, some embodiments that communicate a traffic indication map for a large number of devices may do so by one or more different technical means such as segmenting the traffic indication map into multiple segment bitmaps and communicating the TIM segment bitmaps in multiple beacons. Some embodiments that communicate the content of the traffic indication map may do so by one or more different technical means such as inclusion of a page bitmap as well as an indication for a range of blocks such as a block start and block range or a TIM segment index.

According to one embodiment, the TIM segment bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption.

In several embodiments, an association identifier (AID) structure is defined for the hierarchical data structure for traffic indication mapping. In many embodiments, the AID structure comprises bits identifying a page, bits identifying a block, bits identifying a page or block extension, bits identifying a sub-block, and bits identifying a client device within the particular sub-block. A client device, or station, associated with an AP may parse the AID to determine the page, block, and, depending on the block encoding, the sub-block, and bit position within that sub-block of a TIM segment bitmap that identifies whether or not the AP is buffering data for the client device.

Some embodiments implement Institute of Electrical and Electronic Engineers (IEEE) 802.11 systems such as IEEE 802.11ah systems and other systems that operate in accordance with standards such as the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee-.org/getieee802/download/802.11-2007.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices associated with the communications device 1010. In many embodiments, the AID may comprise 13 bits, wherein the bits identify the page, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030 and update the TIM to indicate the data being buffered for the communications device 1030.

After buffering an MSDU for the communications device 1030, segmentation logic 1013 of the communications device 1010 may generate a representation of the TIM with more than one TIM segment bitmaps and transmit a DTIM beacon with a first TIM segment bitmap to the associated devices. As such, the DTIM beacon is a TIM element that identifies the devices with data buffered by the communications device 1010 by means of a frame such as the frame 1014. In many embodiments, the segmentation logic 1013 may divide or segment the, e.g., M blocks of a page of the TIM into N segments with roughly equivalent numbers of blocks in each segment and generate N TIM segment bitmaps, each representing one of the N segments. In many embodiments, N segments with roughly equivalent numbers of blocks in each segment may mean that the number of blocks per segment may be within four blocks of the number of blocks in any other segment for small numbers of blocks like 32 and might range to plus or minus about 10 blocks for embodiments with, e.g., hundreds of blocks per page.

In some embodiments, the segmentation logic 1013 may also generate a page bitmap to include in one or more TIM elements. The page bitmap may include a logical 1 bit representing each block in the TIM or a corresponding TIM segment bitmap that is associated with at least one station that has data buffered by the communications device 1010.

The communications device 1030 may comprise TIM interpretation logic 1033 to parse and interpret the page bitmap to determine whether a block in the page bitmap associated with the communications device 1030 indicates that at least one station within the block has data buffered by the communications device 1010. In some embodiments, the page bitmap comprises a bit for each block within a page of blocks represented by the TIM segment bitmaps in the DTIM interval. In other embodiments, the page bitmap in the DTIM beacon may only comprise indications for the blocks in the first TIM segment bitmap in the DTIM beacon.

In the present embodiment, the TIM segment bitmap may identify the association identifier (AID) of each device in blocks within the range of blocks included in the TIM segment bitmap that have data buffered by identifying the page, the block, and, depending upon the encoding of the block, the sub-block of the devices. The TIM segment bitmap may also comprise a number of bits such as eight bits that identify the devices in the sub-block that have buffered data via logical ones and zeroes. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

For situations in which the TIM interpretation logic 1033 determines that the page bitmap indicates that the block comprising the communications device's 1030 AID has no buffered data at the communications device 1010, the communications device 1030 may enter a low power state such as a doze state until the next DTIM beacon that has traffic information for the communications device 1030. On the other hand, if the TIM interpretation logic 1033 determines that the page bitmap indicates that the block includes at least one station for which the communications device 1010 is buffering data, the communications device 1030 may receive TIM elements with TIM segment bitmaps until the communications device 1030 receives the TIM segment bitmap with its AID. For instance, in some embodiments, the page bitmap in the DTIM beacon may only include representations for blocks within the first TIM segment bitmap. As such the communications device 1030 may receive TIM beacons with subsequent TIM segment bitmaps and page bitmaps until the communications device 1030 receives the TIM segment bitmap and the page bitmap including the AID of the communications device 1030.

Upon receiving the subsequent TIM elements, the TIM interpretation logic 1033 may parse and interpret the page index field and then the block start and block offset fields of a TIM IE to determine whether the TIM segment bitmap includes the block with the communication device's 1030 AID. In other embodiments, the TIM interpretation logic 1033 may only verify the page at the beginning of the DTIM beacon interval. If the TIM segment bitmap does not comprise the communication device's 1030 AID, the communications device 1030 may enter a low power consumption state until the next TIM beacon transmission.

If the communications device 1030 determines that the TIM segment bitmap comprises the block with the communication device's 1030 AID, in some embodiments, the TIM interpretation logic 1033 may parse and interpret a page bitmap included in the TIM beacon to determine whether the block with the communication device's 1030 AID indicates any devices for which the communications device 1010 is buffering data. If the TIM interpretation logic 1033 determines that the page bitmap indicates that the TIM segment bitmap does indicate devices buffering data in the block of the communications device 1030, the TIM interpretation logic 1033 may begin to parse the TIM segment bitmap. In other embodiments, the TIM beacon may not comprise a page bitmap so the TIM interpretation logic 1033 begins to parse the TIM segment bitmap.

The communications device 1030 may interpret the TIM segment bitmap based upon the association identifier (AID) assigned to the communications device 1030 by the communications device 1010. In many embodiments, the TIM interpretation logic 1033 may parse the AID to determine a page associated with communications device 1030 and may parse and interpret the page index field of the TIM element to determine if the TIM element describes data buffering for stations associated with the same page. If so, the TIM interpretation logic 1033 may parse and interpret the TIM segment bitmap to determine if the TIM segment bitmap describes data buffering for devices with the block index from the AID. If the block index from the AID falls within the range of block indexes identified by a block start field value and an block range field value, the TIM interpretation logic 1033 may repeat the process of parsing the AID and comparing the values of the block and sub-block with those represented by the TIM element to determine whether the TIM element indicates that the communications device 1010 is buffering data for the communications device 1030 and/or whether the TIM segment bitmap includes data at the bit position in the sub-block associated with the communications device 1030.

In other embodiments, the TIM IE may comprise a TIM segment index and a number of TIM segments value. Each device such as communications devices 1030, 1050, and 1055 may determine the range of blocks from a page in the TIM that are included in the TIM segment bitmap based upon the TIM segment index and the number of TIM segments value.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame structure and a traffic indication map (TIM) element based upon a hierarchical data structure such as the hierarchical data structure 1100 illustrated in FIG. 1A. Furthermore, the memory 1011 and 1031 may comprise a traffic indication map in a hierarchical data structure that identifies the associated stations for which data is buffered. For example, the memory 1011 may comprise an indication that the communications device 1010 comprises buffered data as well as a reference or link to the buffered data for the communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the MAC sublayer logic 1018 may generate frames with a TIM element 1014 and the data unit builder of the physical layer logic 1019 may encapsulate the frames with preambles to generate PPDUs for transmission via a physical layer device such as the transceivers (RX/TX) 1020 and 1040.

The frame with the TIM element 1014 may comprise a TIM information element with a TIM segment bitmap based upon a hierarchical data structure and may identify each station within, e.g., one page, that has data buffered by an AP such as communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in frame comprising a TIM information element, which may be included, e.g., as an element within beacon frames generated by the AP. Then, each station may determine that an MSDU is buffered for the station (such as communications device 1030) by receiving and interpreting the TIM information element in the beacon frame. In a base service set (BSS) operating under a distributed coordination function (DCF), upon determining that an MSDU is currently buffered in the AP, a station operating in the PS mode may transmit a PS-Poll frame to the AP. The AP may respond with the corresponding buffered MSDU immediately, or acknowledge the PS-Poll and respond with the corresponding MSDU at a later time.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-input, Multiple-Output (MIMO) system with, e.g., four spatial streams, and may depict degenerate systems in which one or more of the communications devices 1010, 1030, 1050, and 1055 comprise a receiver and/or a transmitter 1020/1040 with a single antenna including a Single-Input, Single Output (SISO) system, a Single-Input, Multiple Output (SIMO) system, and a Multiple-Input, Single Output (MISO) system. In the alternative, FIG. 1A may depict transceivers that include multiple antennas and that may be capable of Multi-User MIMO (MU-MIMO) operation.

In many embodiments, transceivers 1020 and 1040 implement orthogonal frequency-division multiplexing (OFDM). OFDM is a method of encoding digital data on multiple carrier frequencies. In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a hierarchical data structure 1100 for traffic indication mapping with four pages and 32 blocks per page. On the top level of the hierarchy, the traffic indication virtual map may be divided into four pages. Each page may support up to 2048 stations and, in several embodiments, each page may be transmitted as multiple TIM segment bitmaps in separate TIM information elements. In some embodiments, multiple TIM information elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page illustrated comprises up to 32 blocks per page and each of the 32 blocks may support up to 64 of the stations. Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length. Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits. In other embodiments, the AID structure 1150 may comprise more or less than 13 bits.

In the present embodiment, the AID structure 1150 may comprise a page identifier (ID) having two bits (b12-b11), which is represented as "a" in the AID equation depicted below the AID structure 1150. The AID structure 1150 may comprise a page ID/block index extension having two bits (b10-b9), which is represented as "b" in the AID equation. The page ID/block index extension may facilitate a greater ratio of pages per block or blocks per page. The AID structure 1150 may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation.

The AID equation may describe the calculation of a unique number per station based upon the hierarchical data structure illustrated in FIG. 1A. In particular, the AID unique number in this embodiment may be calculated by the following formula:

$$AID=((((\text{Page ID}\times 4+(\text{Page ID/Block index extension}-1))\times 8+(\text{Block index}-1))\times 8+(\text{Sub-block index}-1))\times 8+(\text{station bit position index})$$

To illustrate, if the variables are: the Page ID=0, the page ID/block index=1, the block index=2, the sub-block index=6. As a result, the equation becomes:

$$AID=((((0\times 4+(1-1))\times 8+(2-1))\times 8+(6-1))\times 8+(4)=108$$

Figure 1C:
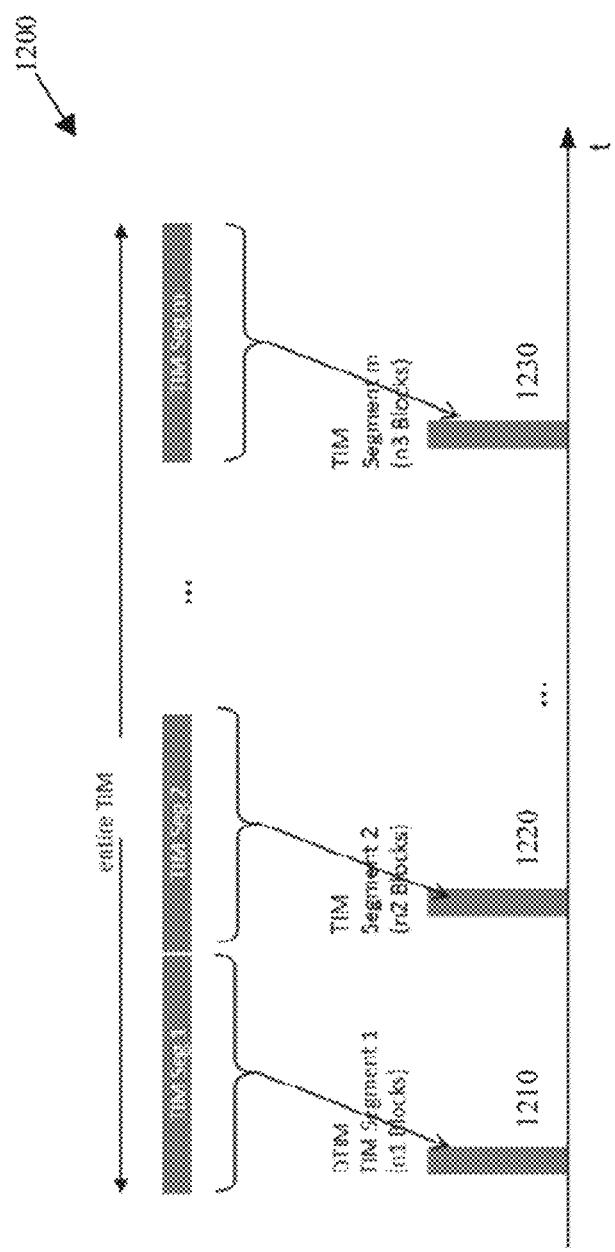
FIG. 1C depicts an embodiment of a scheme of TIM segmentation and transmission.

FIG. 1C illustrates an example 1200 TIM segmentation and transmission of TIM segment bitmaps. The example 1200 depicts a time axis T and TIM segment bitmaps 1 to M. In the present embodiment, the TIM is segmented into M segments to generate M segment bitmaps and the segment bitmaps are transmitted to the client devices in M TIM elements. The DTIM beacon interval begins with the first TIM element, a beacon 1210. The beacon 1210 may comprise the first TIM segment bitmap, TIM Segment 1 and may comprise a page bitmap representative of blocks for at least the TIM Segment 1. In some embodiments, the DTIM beacon may comprise a page bitmap representative of blocks for all the TIM Segments 1 through M. In other embodiments, the page bitmap may represent one or more pages of the TIM.

In many embodiments, the page bitmap may include one bit per block and that bit may indicate either that all bits in the block are the same or that at least one bit is set differently. In some embodiments, the bit may indicate if at least one bit in the block is set to indicate that data is buffered for a station with an AID in the block.

Generally speaking, the bitmap segmentation principles disclosed herein may provide power savings to the at least one communications device. The power saving operations may be performed in any type of the communications devices 1030, 1050, and 1055 or in at least one of components of the communications device 1030) by selectively switching between a sleeping mode and an operation mode.

Figure 1D:
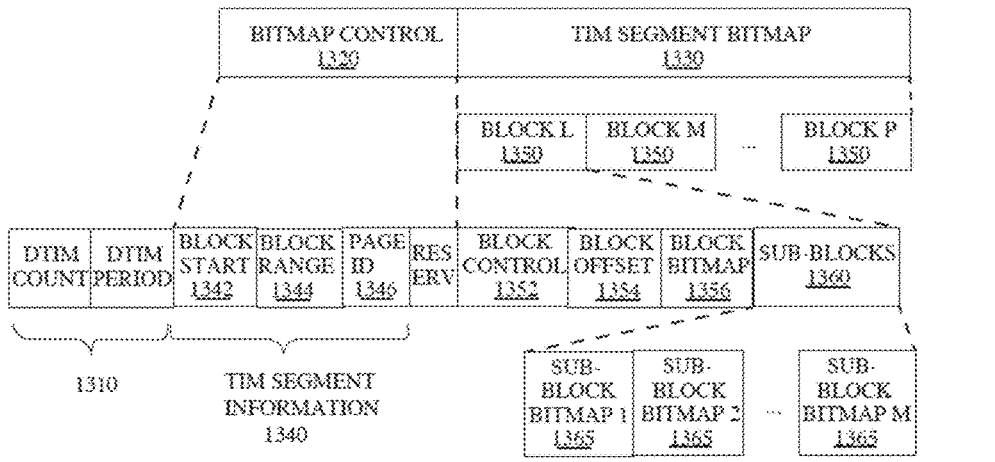
FIGS. 1D-F depict another embodiment of a scheme of TIM segmentation and transmission.

FIG. 1D illustrates a TIM IE structure 1300 according to some embodiments. The TIM IE structure 1300 may include a plurality of fields having Delivery Traffic Indication Message (DTIM) information 1310 including fields DTIM Count and DTIM Period, bitmap control information 1320, and a TIM segment bitmap 1330.

The bitmap control information 1320 may include TIM segment information 1340, which, in turn, may include a Block Start field 1342, a Block Range field 1344, and a Page Index field 1346. The bitmap control information 1320 may also include a reserved field. The Block Start field 1342 may comprise a value to indicate an information block start index of the TIM segment covered by the TIM IE. The Block Range field 1344 may comprise a value to indicate a number of information blocks covered by the TIM IE starting from the information block start index.

As illustrated in FIG. 1D, the TIM segment bitmap 1330 may include a plurality of information blocks 1350. Each information block 1350 may include a Block Control field 1352, a Block Offset field 1354, a block bitmap 1356, and a plurality of information sub-blocks 1360. Each information sub-block 1360, if included, may comprise a plurality of sub-block bitmaps 1365. The Block Control field 1352 may comprise a value indicative of the encoding of the block and possibly sub-block information that follows. The Block Offset field 1354 may comprise offset information to indicate the offset of the block information that follows. The Block Bitmap field 1356 may comprise an indication of sub-blocks for which the communications device 1010 has or does not have data buffered.

Figure 1E:
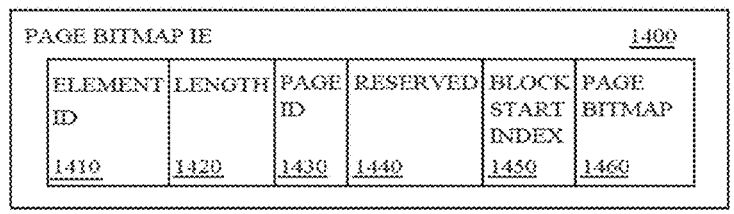

FIG. 1E illustrates a page bitmap IE 1400 according to some embodiments. As shown in the FIG. 1E, the page bitmap IE 1400 may include the following fields: an Element ID field 1410, a Length field 1420, a Page Index field 130, a reserved field 1440, a Block Start Index field 1450, and a Page Bitmap field 1460. The Element ID field 1410 may identify the type of information element such as a page bitmap IE. The Length field 1420 may indicate the length of the information element, the length of the information after the Length field 1420, or at least the length of the Page Bitmap field 1460.

The Page Index field 1430 may indicate page indicia of the page bitmap. In other words, bit positions of the Page Index field 1430 may indicate the corresponding block index. If such bit is set to 1, a corresponding communications device 1030 may recognize that the data buffered in the communications device 1010 is available for the communications device 1030. In operation, when the communications device 1030 reads the page bitmap IE 1400 and determines that a bit associated with the communications device 1030 corresponding to an information block is set to 1, the communications device 1030 may receive the corresponding TIM segment bitmap with more information. Otherwise, when there is no data available for the communications device 1030, the corresponding bit in the Page Bitmap field 1460 may be set to 0 and the communications device 1030 may switch to the sleeping mode to reduce power consumption.

The Block Start Index field 1450 may include an index associated with a first non-zero information block of the TIM IE and provide the starting information block position of the page bitmap. The Page Bitmap field 1460 may provide the mentioned block level information associated with a particular page of the TIM IE.

Figure 1F:
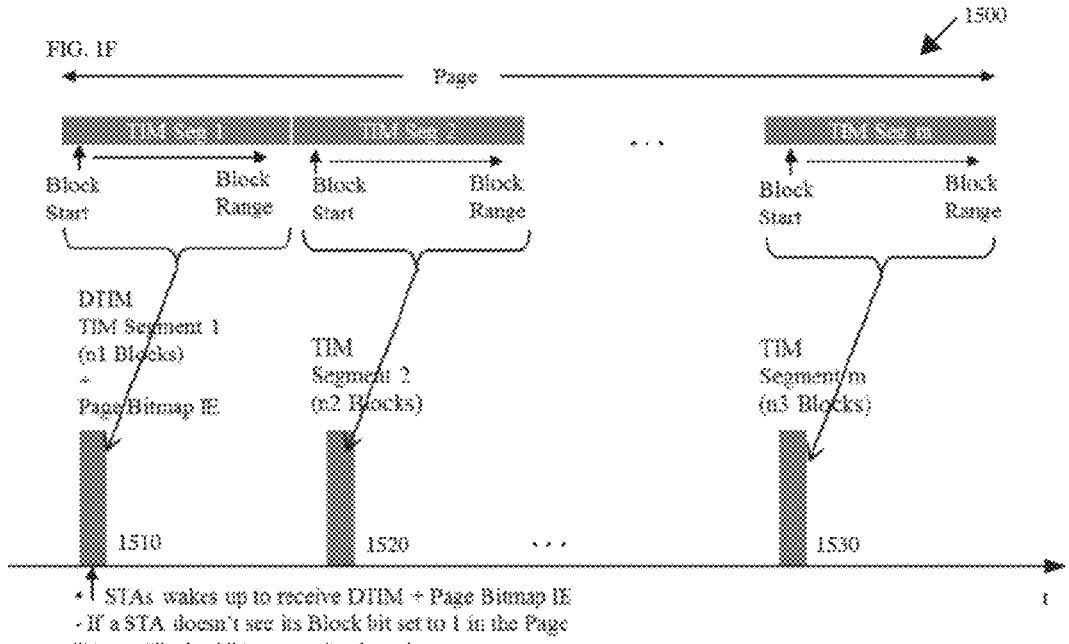

FIG. 1F illustrates TIM IE segmentation 1500 according to some embodiments. In FIG. 1F, a time axis T and beacons 1510, 1520, and 1530 illustrate multiple TIM segments 1 to M being transmitted from the communications device 1010 to the communications device 1030. The communications device 1010 may generate and transmit the DTIM beacon 1510 including a first TIM segment bitmap. TIM segment 1, and a page bitmap IE such as the Page Bitmap IE 1400 illustrated in FIG. 1E. In the present embodiment, the Page Bitmap IE 1400 comprises bits representing all the blocks in the TIM Segments 1 through M.

During the subsequent TIM beacon intervals, the communications device 1010 may transmit the TIM segment bitmaps, TIM Segment 2 through TIM Segment M without a corresponding page bitmap IE. In operation, when the page bitmap IE is received by the communications device 1030 and the communications device 1030 does not find an information block bit set to 1 indicating that data might be buffered for the communications device 1030, the communications device 1030 may enter a low power consumption mode. Otherwise, the communications device 1030 may continue to operate in a receive mode to receive subsequent beacons until the communications device 1030 receives a TIM segment corresponding to the communications device's 1030 AID. In other embodiments, the information in the page bitmap IE 1400 may be included in a TIM IE.

Figure 1G:
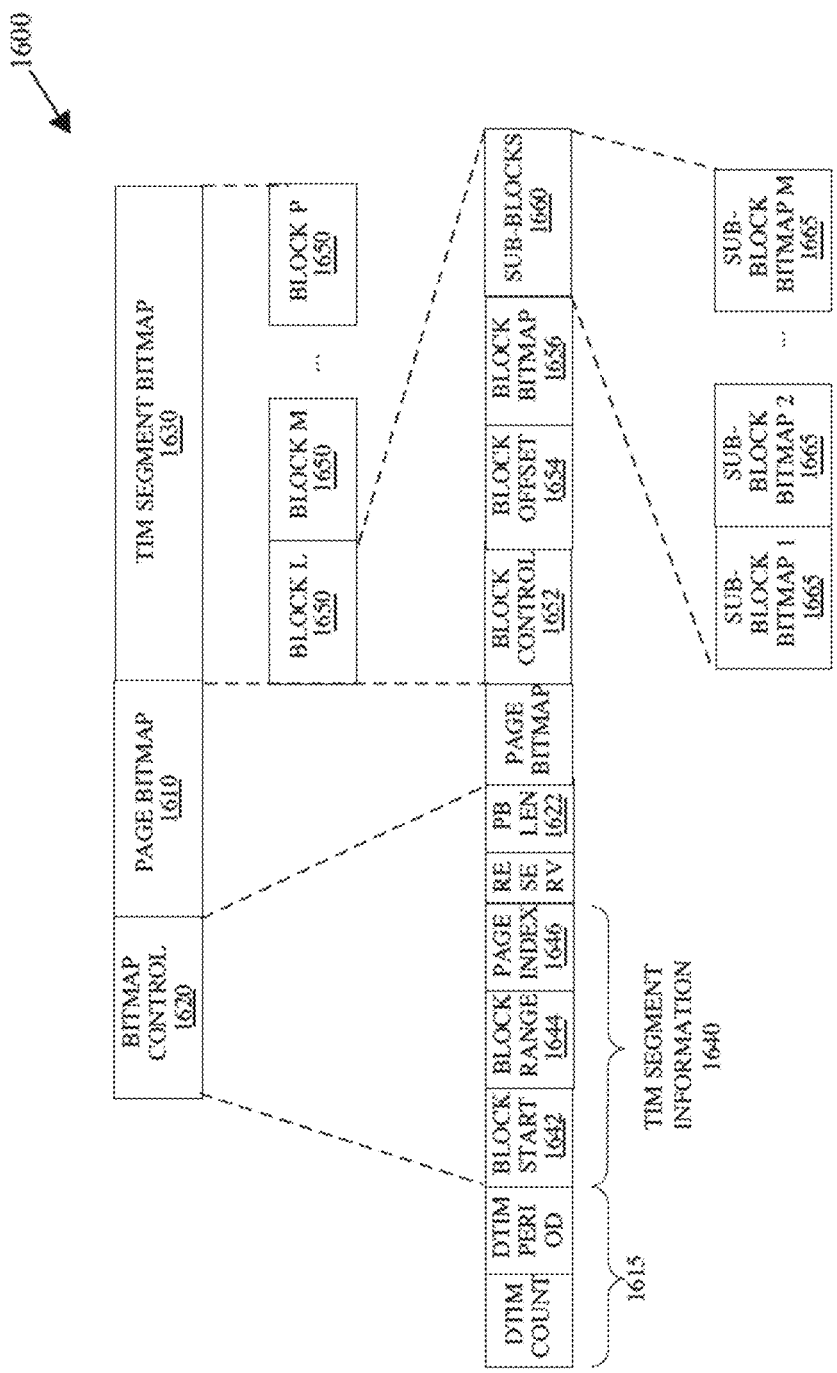
FIG. 1G depicts another embodiment of a scheme of TIM segmentation for transmission.

FIG. 1G illustrates an example TIM IE structure 1600 that may include a page bitmap according to some embodiments. More specifically, the TIM IE structure 1600 may include multiple fields having DTIM information 1615 represented by the fields DTIM Count and DTIM Period, a bitmap control information field 1620, a TIM segment bitmap 1630, and a page bitmap field 1610. The bitmap control information 1620 may include TIM segment information 1640, which, in turn, may include a Block Start field 1642, a Block Range field 1644, and a Page Index field 1646. The Block Start field 1642 may indicate an information block start index of the TIM segment covered by the TIM IE. The Block Range field 1644 may indicate a number of information blocks covered by the TIM IE starting from the information block start index. The bitmap control information 1620 may also include a reserved field "Reserv". Furthermore, the bitmap control information 1620 may also include a page bitmap length "PB Len" field 1622, which defines a length of the Page Bitmap field 1610. The length of the Page Bitmap field 1610 may comprise values that vary between 0 and 3 (binary bits 00, 01, 10, and 11, respectively) and may be 1 to 4 octets in length.

The TIM segment bitmap 1630 may include a plurality of information blocks 1650. Each information block 1650 may include a Block Control field 1652, a Block Offset field 1654, a block bitmap 1656, and a plurality of information sub-blocks 1660. Each information sub-block 1660 may include a plurality of sub-block bitmaps 1665.

In the present embodiment, the Page Bitmap field 1610 may indicate the block level information of a corresponding page. Furthermore, a bit in the reserved field may be used to indicate whether or not the page bitmap field is present. According to some embodiments, a page bitmap may be distributed within a plurality of TIM segment bitmaps substantially evenly. For instance, in some embodiments, a page bitmap may include M information blocks and these M information blocks may be divided into N TIM segment bitmaps proportionally (e.g., as evenly as possible without splitting information for a single block into more than one bitmap). In such embodiments, each TIM segment bitmap may have M divided by N (M/N) blocks.

FIG. 1H illustrates a page bitmap IE 1700 according to some embodiments. The page bitmap IE 1700 may comprise an Element ID field 1710, a Length field 1720, a Number of TIM segments (N) field 1730, a reserved field "R" 1740, a Page Index field 1750, and a Page Bitmap field 1760. The Number of TIM segments (N) field 1730 may indicate the total number of TIM segment bitmaps in the page of the TIM indicated by the Page Index 1750. The Page Index field 1730 may indicate the page associated with the page bitmap 1770. Each bit position of Page Bitmap field 1760 may uniquely define the corresponding block index. If such bit is set to 1, a corresponding communications device 1030 may recognize that there is data buffered in the communications device 1010 for at least one station in the corresponding block. In operation, when a communications device 1030 reads the page bitmap 1770 and determines that a particular bit is set to 1 that corresponds to the block comprising the AID of the communications device 1030, the communications device 1030 may decode, parse and interpret the corresponding TIM segment bitmap to determine whether the communications device 1010 is buffering data for the communications device 1030. The Page Bitmap field 1760 may indicate block level information for M/N blocks in the page.

FIG. 1I illustrates an embodiment of a TIM IE 1800 such as the TIM IE shown in FIG. 1I. As shown in FIG. 1H, the TIM IE 1800 may include a plurality of fields such as an Element ID field 1802, a Length field 1806, DTIM information 1820, bitmap control information 1825, and a TIM segment bitmap 1814. The DTIM information 1820 may comprise a DTIM Count field 1808 and a DTIM Period field 1810. The element ID field 1802 may be one octet and may identify the element as a TIM IE 1800. The length field 1806 may be one octet and may define the length of the TIM IE 1800 or the length of a portion thereof. The DTIM count 1808 may be one octet and may indicate how many beacon frames (including the current frame) appear before the next DTIM frame.

A DTIM Count field 1808 value of 0 may indicate that the current TIM information element frame is a DTIM frame. For instance, immediately after every DTIM (beacon frame with DTIM Count field 1808 of the TIM IE 1800 equal to zero), the AP shall transmit all buffered, group-addressed frames. If the TIM indicating the buffered MSDU or aggregate MSDU (A-MSDU) is sent during a contention-free period (CFP), a contention-free (CF)-Pollable station operating in the power-savings (PS) mode does not send a power-saving (PS) Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1810 may be one octet and may indicate the number of beacon intervals between successive DTIMs. In many embodiments, if all TIM information element frames are DTIMs, the DTIM period field 1810 may have the value 1.

The bitmap control information 1825 may comprise a TIM Segment ID (N) field 1811, a reserved field 1812, and a Page ID field 1813. The TIM Segment ID (N) field 1811 may represent a TIM segment index of the TIM IE 1800. In some embodiments, N ranges from zero to the number of segments minus one. The Page ID field 1813 may provide the index for the page represented by the TIM segment bitmap 1814. And the TIM Segment bitmap 1814 may comprise a plurality of information blocks, which, in turn, may comprise a Block Control field, a Block Offset field, an information block bitmap, and a plurality of information sub-blocks (not shown).

When a page bitmap 1770 with M blocks and the number of TIM segments (N) 1730 are received by the communications device 1030, the communications device 1030 may determine the size of each TIM segment bitmap. Furthermore, the communications device 1030 may determine the TIM segment bitmap index that comprises its AID because the communications device 1030 can determine the size of the TIM segment bitmaps and the block index associated with the communications device 1030. For example, the size of each TIM segment may be calculated as M divided by N, where N is the total number of TIM segments, M is the total size of the page bitmap in blocks, and n is the range of [0:N−1]. Accordingly, the TIM segment start block index and the TIM segment end block index may be determined as follows:

TIM segment start block index=TIM segment size*TIM segment index+1=(M/N)*n+1

TIM segment end block index=TIM segment size* (TIM segment index+1)=(M/N)*(n+1)

FIG. 1J illustrates a TIM IE segmentation and transmission 1850 according to some embodiments. Shown in FIG. 1J are a time axis t and time points associated with multiple TIM segments 1 to m which may be transmitted from the communications device 1010 to the communications device 1030. The DTIM beacon 1860 may include a first TIM segment bitmap having M/N information blocks such as TIM segment bitmap 1814 as well as the page bitmap IE 1700. In further beacon intervals, TIM segments 1860, 1870, 1880 having M/N information blocks may be transmitted without the page bitmap IE. In operation, when the page bitmap IE is received by a particular communications device 1030 and the communications device 1030 does not include block bit set to 1 in the page bitmap 1770, the communications device 1030 may enter a sleep state or other reduced power state. Otherwise, the communications device 1030 may enter a receive mode to receive the TIM beacon comprising the TIM segment index 1811 that has the TIM segment block start index and the TIM segment block end index within which the block index of the communications device 1030 falls. In some embodiments, the communications device 1030 may remain in a sleep state until the TIM beacon with its AID is to be transmitted. In other embodiments, the communications device 1030 may remain in a receive mode until the TIM beacon with its AID is received.

Figure 1L:
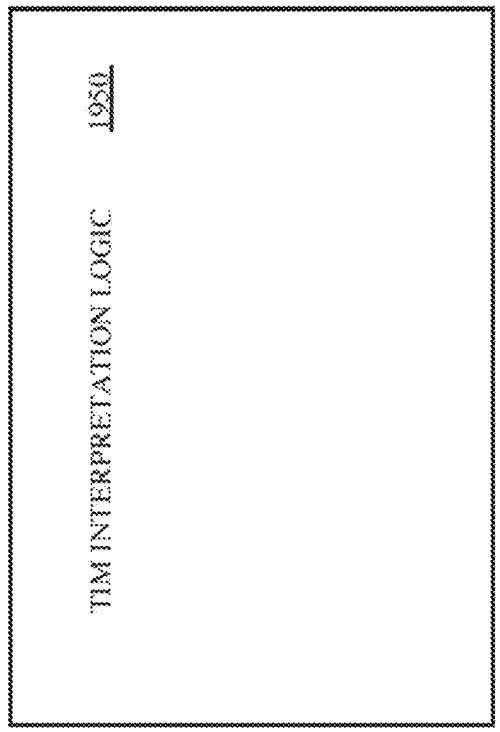
FIGS. 1K-L depict embodiments of logic to generate, transmit, receive and interpret a frame with a TIM segment bitmap based upon a hierarchical data structure for TIM.
Figure 1K:
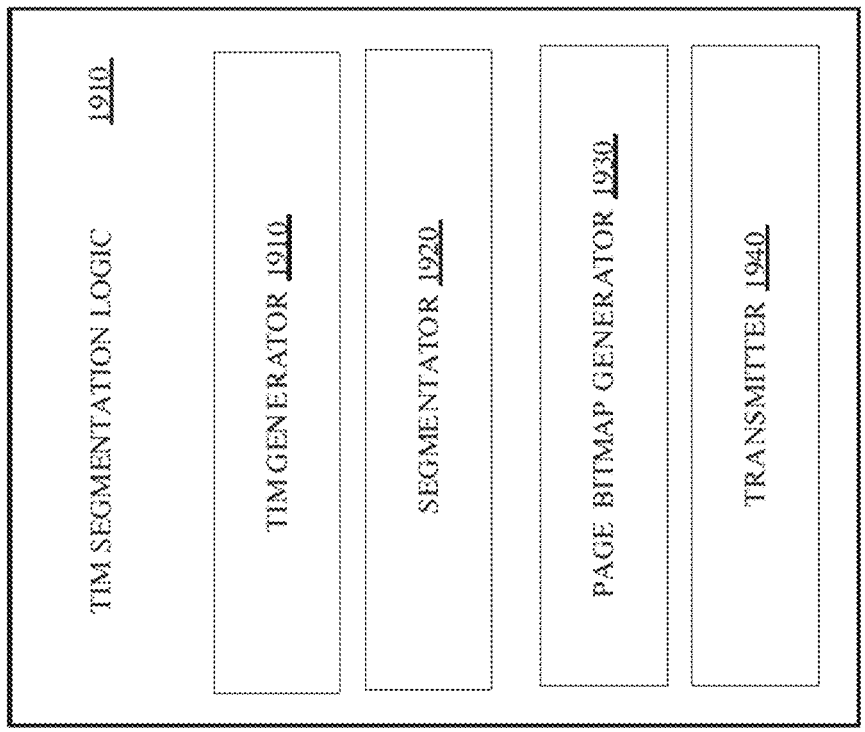

FIG. 1K illustrates TIM segmentation logic 1910 for transmitting data suitable for implementation of various example methods disclosed herein. The TIM segmentation logic 1910 may reside in the communications device 1010 and may comprise multiple code and/or hardware implemented modules. In one embodiment, the TIM segmentation logic 1910 may embed or be coupled to a TIM generator 1910, a segmentator 1920, a page bitmap generator 1930, and a transmitter 1940. The modules 1910-1940 may be integrated within a single apparatus, or, alternatively, may be remotely located and, optionally, accessed via a third party. The TIM segmentation logic 1910 may further include additional modules.

With the continuing reference to FIG. 1K, the TIM generator 1910 may be configured to generate a TIM. The TIM may comprise a plurality of information blocks. Each information block may comprise data buffered or a link to data buffered in the communications device 1010 for client devices. Moreover, each information block may be associated with an AID uniquely identifying data in the communications device 1010 as being allocated for a specific communications device such as the communications device 1030. In some embodiments, the TIM generator 1910 may also generate a TIM bitmap with indications of the buffered data to transmit in the TIM IEs of DTIM beacons and TIM beacons.

The segmentator 1920 may be configured to segment the TIM by generating TIM segment bitmaps. In some embodiments, the segmentator 1920 may divide a TIM bitmap covering all blocks for at least one page into multiple TIM segment bitmaps. In other embodiments, the segmentator 1920 may segment the TIM by generating TIM segment bitmaps. In many embodiments, the segmentator 1920 may generate TIM segment information indicating a number and a location of at least one information block within the TIM to transmit along with the TIM segments in TIM IEs. In several embodiments, the TIM segment information may comprise a page index, a block start index and a block range. In other embodiments, the TIM segment information may comprise a TIM segment index and a page index.

The page bitmap generator 1930 may be configured to generate a page bitmap. The page bitmap may comprise at least one bitmap indicia, which may be uniquely associated with the plurality of information blocks. The page bitmap may be incorporated into the DTIM beacons and/or TIM beacons with the TIM segment bitmaps. In some embodiments the page bitmap may be included in a beacon in a separate page bitmap IE. In further embodiments, the page bitmap generator 1930 may be configured to segment the page bitmap into a plurality of page bitmap segments corresponding to the number of TIM segment bitmaps. In other embodiments, the page bitmaps may be generated as separate page bitmaps, each covering blocks represented by a corresponding TIM segment bitmap. In several embodiments, the page bitmap generator 1930 may associate each page bitmap with a number of TIM segments and a page index for transmission along with the page bitmap in a page bitmap IE, a TIM IE, or the like. In some embodiments, the page bitmap generator 1930 may associate each page bitmap with a page index and a block start index for transmission along with the page bitmap in a page bitmap IE, a TIM IE, or the like.

The transmitter 1940 may be configured to transmit the page bitmap(s) and the plurality TIM segment bitmaps to at least one communications device such as the communications device 1030. The transmitter 1040 may be further configured to transmit the DTIM IE to the at least one communications device. In some example embodiments, the page bitmap IE and a first TIM segment bitmap may be transmitted to the at least one communications device within a single beacon transmission.

FIG. 1L depicts an embodiment of TIM interpretation logic 1950. The TIM interpretation logic 1950 may reside in a client device such as the communications device 1030 of an access point (AP) such as the communications device 1010. In many embodiments, the TIM interpretation logic 1950 may be designed to receive page bitmaps and TIM segment bitmaps in beacons, decode the beacons, and parse and interpret the decoded page bitmaps and TIM segment bitmaps to determine whether the AP is buffering data for the client device.

In several embodiments, the TIM interpretation logic 1950 may comprise part of the medium access control (MAC) logic of the client device such as the MAC sublayer logic 1033 illustrated in FIG. 1. In such embodiments, the TIM interpretation logic 1950 may receive the decoded beacon while the physical layer (PHY) is decoding the beacon or after the PHY decodes the beacon. For instance, the beacon may comprise a management frame that is received by the PHY encapsulated by at least a PHY preamble. The PHY may decode the beacon, decapsulating the management frame as the management frame is being received.

The MAC logic may parse the management frame at the MAC header to determine from a frame control field that the type of frame is a management frame and the subtype of the frame is a beacon. Thereafter, the MAC logic may determine from memory such as memory 1031 that the beacon frame may comprise additional MAC header information in other header fields as well as a frame body and a frame check sequence (FCS). In other embodiments, the MAC logic may parse the FCS from the end of the MAC frame to check for bit errors prior to parsing and interpreting the frame control field.

Upon reaching the frame body, the MAC logic may determine that the frame body comprises, e.g., at least one information element, a TIM IE and, in some embodiments, a page bitmap IE. The TIM interpretation logic 1950 may parse and interpret the at least one information element. The TIM interpretation logic 1950 may determine that the beacon comprises a page bitmap along with page bitmap information and a TIM segment bitmap along with TIM segment information. The TIM interpretation logic 1950 may parse and interpret the page bitmap information to determine if the page bitmap includes a representation of a block that comprises the association identifier (AID) of the client device and, if so, whether the page bitmap indicates that the block includes at least one station that has data buffered by the AP. If the page bitmap does not contain the block, the client device may receive, parse and interpret a subsequent page bitmap with the block. If the block indicates that there are no devices within the block that have data buffered by the AP then the client device may return to a low power state and awake for a subsequent DTIM beacon.

In response to determining that the block comprising the AID of the client device has at least one station with data buffered by the AP, the TIM interpretation logic 1950 may parse and interpret the TIM segment bitmap information to determine the page and the range of blocks represented by the TIM segment bitmap. In some embodiments, this process is part of the process for determining whether the page bitmap includes the block with the client device's AID. In other embodiments, the process is independent.

If the TIM segment bitmap does not contain the block the client device may receive, parse and interpret the TIM segment bitmap with the block. If the block indicates that client device does not have data buffered by the AP then the client device may return to a low power state and awake for a subsequent DTIM beacon. And if the block indicates that client device does have data buffered by the AP then the client device may either prepare to receive the data or transmit a PS Poll or other trigger frame to effectively request that the data be transmitted to the client device.

Figure 2:
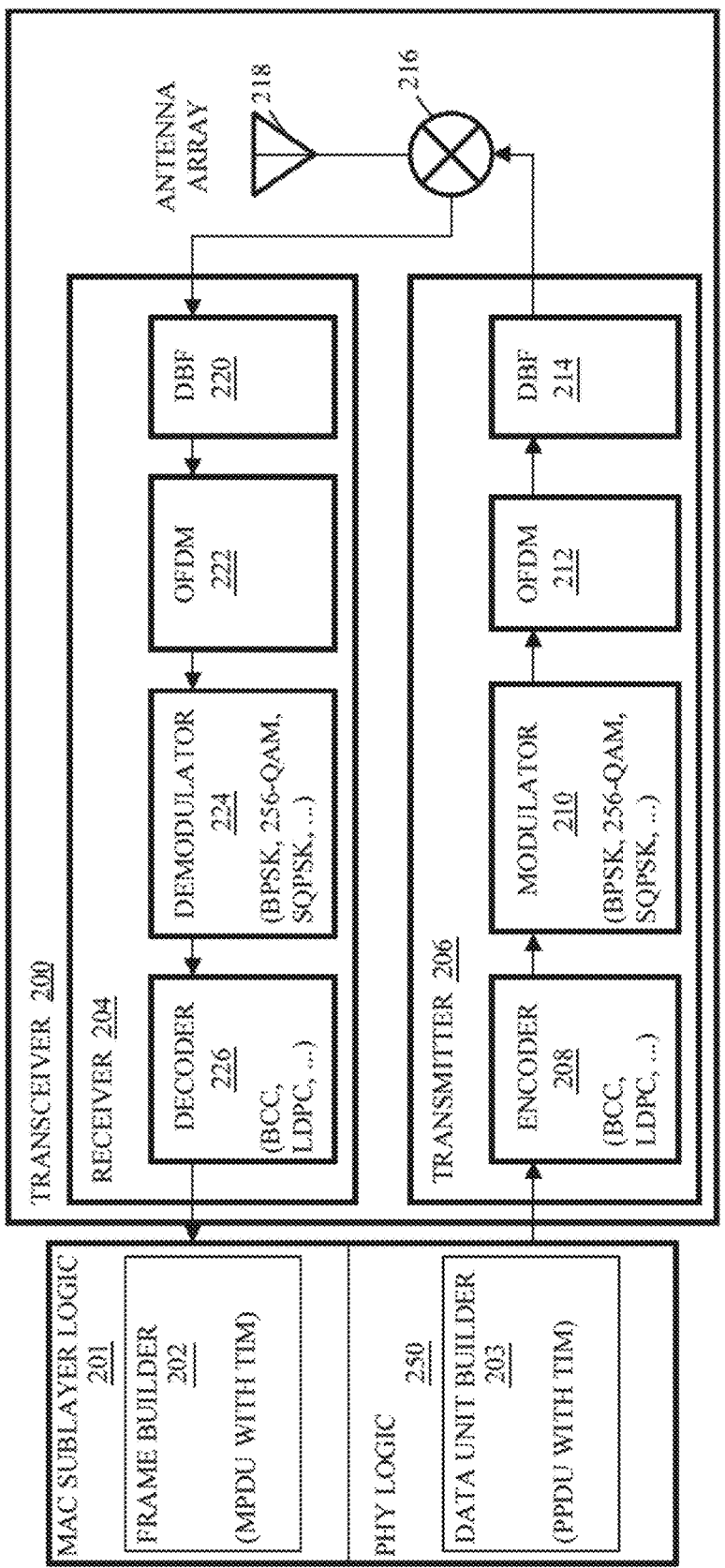
FIG. 2 depicts an embodiment of an apparatus to generate, transmit, receive and interpret a frame with a TIM segment bitmap based upon a hierarchical data structure for TIM.

FIG. 2 depicts an embodiment of an apparatus to generate, transmit, receive, and interpret or decode a traffic indication map (TIM) element in a frame. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 to generate frames such as one of the management frame with a TIM segment bitmap and an page bitmap such as those illustrated in FIGS. 1C-I. The TIM elements may comprise data indicative of MAC service data units (MSDUs) buffered or stored by an associated access point (AP) for particular stations associated with the AP. Association identifiers (AIDs) may identify the stations or client devices. The AP such as the communications device 1010 and a client device such as the communications device 1030 in FIG. 1 may maintain some or part of the TIM elements and values in memory such as the memory 1012 and 1032 illustrated in FIG. 1.

The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more TIM elements included in the MPDU(s). For each TIM information element, the MAC sublayer logic 201 may parse the TIM IE and/or the page bitmap IE to determine the number of pages and the number of blocks per page so the MAC sublayer logic 201 can parse the page bitmap and the bitmap control field and block offset field of the TIM segment bitmap. If a bit associated with the client device is not present or is a logical zero, then the client device may not have data buffered at the AP. On the other hand, if the bit associated with the client device is present and is a logical one, the client device may have data buffered at the AP.

In other embodiments, if an inverse encoding for a block is set in the TIM element, the sub-blocks may refer to sub-blocks that do not have data buffered, or the bits associated with the AID of the client device may comprise a logical zero to indicate that data is buffered for the client device at the AP and a logical one to indicate that data is not buffered at the AP.

Figure 3:
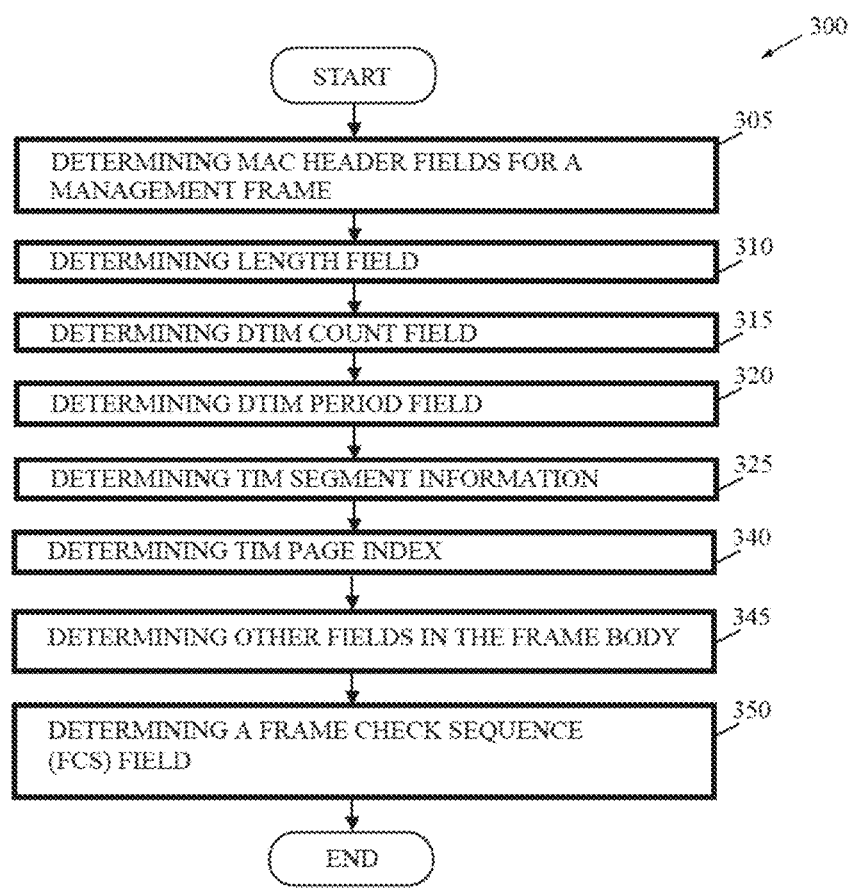
FIG. 3 depicts an embodiment of a flowchart to generate a frame with a TIM segment bitmap based upon a hierarchical data structure for TIM.

FIG. 3 depicts an embodiment of a flowchart to generate a TIM segment bitmap based upon a hierarchical data structure for traffic indication mapping described in conjunction with FIGS. 1-2. The flowchart 300 may begin with determining MAC header fields for a management frame (element 305). For instance, MAC logic such as the MAC sublayer logic 1018 of the communications device 1010 in FIG. 1 may determine a value for a frame control field including the type and subtype values indicative of the particular type of management frame as well as other MAC header fields.

After determining the MAC header, the MAC logic may determine the length to include in the length field (element 310). The length may be the length of the entire frame, the length of the TIM segment bitmap, or another length. The MAC logic may determine the DTIM count field value (element 315), the DTIM period value (element 320), and then the TIM segment information field(s) (element 325). In many embodiments, the MAC logic may access memory such as memory 1011 in FIG. 1 to determine that current page and block counts of the TIM segment bitmap. For example, in some embodiments, the access point (AP) determine and include as the TIM segment information, a Block Start field with the block start index for the TIM segment bitmap and a Block Range field with the number of blocks covered by the TIM segment bitmap and starting from the block start index. In other embodiments, the AP may determine and include the TIM segment index. In such embodiments, the number of blocks in the TIM and the number of TIM segments may provide sufficient information for client devices to determine the block start index and the range of blocks included in each TIM segment bitmap as well as the corresponding page bitmap based upon the TIM segment indices.

After determining the TIM segment information, the MAC logic may determine the TIM page index (element 340). The TIM page index may provide the index value for the page in the traffic indication map associated with the page bitmap and the TIM segment bitmap.

Thereafter, the MAC logic may determine other fields in the frame body (element 345) such as a TIM segment bitmap and the page bitmap. For instance, the TIM segment bitmap may comprise a block offset field. The block offset field may comprise a value indicative of a block offset for the corresponding block bitmap in the TIM segment bitmap and the block offset may be the number of blocks from the first block in the page represented by the TIM segment bitmap or the first or starting block in the TIM segment represented by the TIM segment bitmap. In such embodiments, the MAC logic may determine the block offset of the first block represented by a bitmap in the TIM segment bitmap based upon the number of pages and the number of blocks per page. Alternatively, the MAC logic may read the block offset from memory or from the traffic indication map in the memory.

After determining the rest of the frame, the MAC logic may determine a frame check sequence (FCS) field value (element 350). In some embodiments, for instance, the MAC logic may determine a hash of the frame and include the value of the hash in the FCS field so that a station that receives the frame can perform the same hash to determine if the frame received comprises bit errors.

Figure 4:
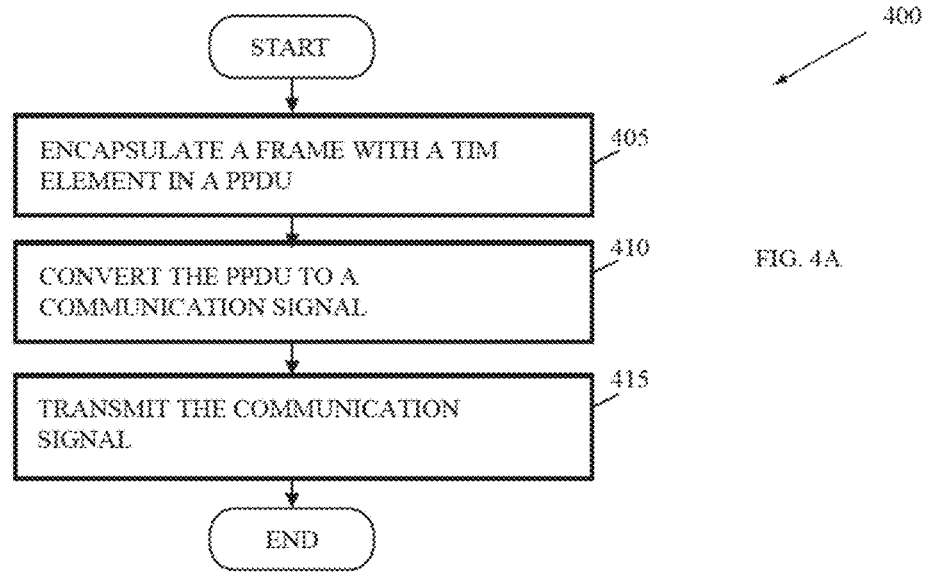
FIGS. 4A-B depict embodiments of flowcharts to transmit, receive, and interpret communications with frames having TIM segment bitmaps based upon a hierarchical data structure for TIM as illustrated in FIG. 2.

FIGS. 4A-B depict embodiments of flowcharts 400 and 450) to transmit, receive, and interpret or decode communications with a management frame with a TIM element such as the TIM elements illustrated in FIGS. 1C-I. Referring to FIG. 4A, the flowchart 400 may begin with receiving a frame from the frame builder comprising one or more TIM elements such as a TIM information element and/or a TIM parameter information element. The MAC sublayer logic of the communications device may generate the frame as a management frame to transmit to a station and may pass the frame as an MPDU to a data unit builder that transforms the data into a packet that can be transmitted to a station. The data unit builder may generate a preamble to encapsulate one or more of the MPDUs from the frame builder to form a PPDU for transmission (element 405).

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the TIM segment bitmap and page bitmap in each of the MPDUs. For instance, the MAC sublayer logic may parse the TIM IE or both a TIM IE and a page bitmap IE to determine the value of a TIM segment index field or block start and block range fields, the page ID field, one or more block offset fields, a block control field for one or more blocks, possibly a block bitmap field, and possibly the sub-block bitmap fields for one or more sub-block bitmaps to determine whether the bit associated with the AID for the receiving station indicates that the AP is buffering data for the station (element 470). In some embodiments, the MAC sublayer logic may determine whether the other fields in the TIM element(s) indicate that the data will be broadcast to a group of devices after receipt of the beacon comprising the TIM element, or if the AP will await a frame from the station instructing the AP to send the frame.

Figure 5:
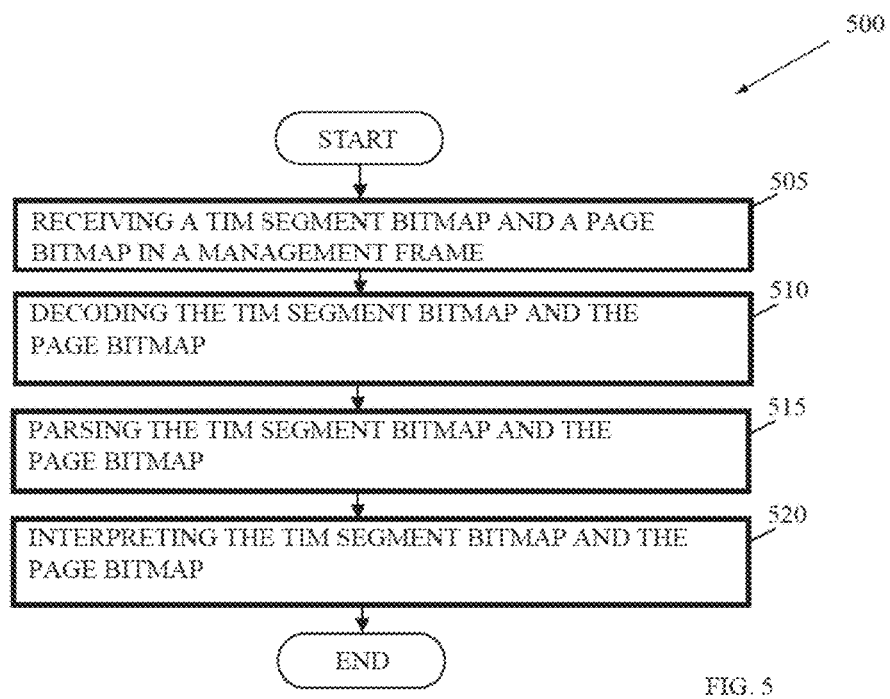
FIG. 5 depicts an embodiment of a flowchart to receive and decode frames with TIM segment bitmap and a page bitmap.

FIGS. 5A-B depict embodiments of flowcharts to receive, decode, parse, and interpret frames with a TIM segment bitmap and a page bitmap. In FIG. 5A, the flowchart 500 begins with receiving a TIM segment bitmap and a page bitmap in a management frame such as a beacon frame or other frame (element 505).

After receiving the TIM parameter information element, the PHY logic may decode the fields of the management frame such as the MAC header and then decode the frame body. In several embodiments, after the PHY logic decodes the frame body and passes the decoded frame to the MAC logic, the MAC logic may perform a cyclic redundancy check and parse the frame body to identify the TIM IE and/or the page bitmap IE (element 510).

In many embodiments, the MAC logic may access memory such as the memory 1031 in the communications device 1030 of FIG. 1 to determine the frame structure of the TIM IE and the page bitmap IE. After determining the frame structure, the MAC logic may parse the TIM IE and the page bitmap IE to determine the TIM segment index or block start and block offset indices, and the page index (element 515).

Then the MAC logic may parse the page bitmap and TIM segment bitmap (element 515).

In many embodiments, parsing the fields of the frame involves obtaining the values for the fields from the frame with an association based upon the frame structure in memory, between the particular field and the value. After parsing the values, the MAC logic may interpret the values parsed from the frame by determining an appropriate response to such information in the TIM segment bitmap and the page bitmap (element 520). For instance, the MAC logic may first parse and interpret the field values of the page bitmap. More specifically, the MAC logic may parse the block bit associated with the AID of a client device to determine that the value of the block is a logical one. The MAC logic may then interpret that value to determine that the value means that the client device might have data buffered at the corresponding access point. Alternatively, the MAC logic may determine that the logical one indicates that the MAC logic will continue to parse and interpret the TIM segment bitmap to determine whether the client device has data buffered at the access point. Thereafter, the MAC logic may then parse and interpret the TIM segment bitmap to determine whether the client device has data buffered at the access point.

The following examples pertain to further embodiments. One example comprises a method. The method may involve generating, by a medium access control logic, a frame comprising a first traffic indication map segment bitmap and a page bitmap, wherein the first traffic indication map segment comprises a first of more than one traffic indication map segment bitmaps for one page of a traffic indication map and the page bitmap comprises bits representative of blocks of client devices within the first traffic indication map segment bitmap; and encapsulating, by physical layer logic, the frame with a preamble to create a physical layer protocol data unit to transmit.

In some embodiments, the method may further comprise storing, by the medium access control logic, the traffic indication map in a memory in accordance with a hierarchical data structure, wherein the hierarchical data structure comprises assignments of stations to sub-blocks, sub-blocks to one or more blocks, and the one or more blocks to one or more pages. In some embodiments, the method may further comprise generating a second frame comprising a second traffic indication map segment bitmap and a second page bitmap. In many embodiments, generating the frame comprises generating the frame with the page bitmap in a page bitmap element, wherein the page bitmap comprises bits representative of all the blocks within the one page. In several embodiments, generating the frame comprises generating the frame with the first traffic indication map segment bitmap in a traffic indication map information element, wherein the traffic indication map information element comprises the page bitmap in a page bitmap field. In some embodiments, generating the frame comprises generating the frame with the traffic indication map element comprising a traffic indication map segment index, wherein the traffic indication map segment index indicates a index value for the first traffic indication map segment bitmap. And, in some embodiments, generating the frame comprises generating the frame with the first traffic indication map segment bitmap in a traffic indication map information element, wherein the traffic indication map information element comprises a block start value and a block range value.

Another example comprises an apparatus. The apparatus may comprise a medium access control logic to generate a frame comprising a traffic indication map element, wherein the traffic indication map element comprises a value for a number of pages indicative of a hierarchical structure for a traffic indication map bitmap and a value for a number of blocks associated with each of the number of pages indicative of the hierarchical structure for the traffic indication map bitmap; and a physical layer logic coupled with the medium access control logic to encapsulate the frame with a preamble to create a physical layer protocol data unit to transmit.

In some embodiments, the apparatus may further comprise a transmitter coupled with an antenna to transmit the frame. In some embodiments, the medium access control logic comprises logic to generate a second frame comprising a second traffic indication map segment bitmap and a second page bitmap. In some embodiments, the medium access control logic comprises logic to generate the frame with the page bitmap in a page bitmap element, wherein the page bitmap comprises bits representative of all the blocks within the one page. In some embodiments, the medium access control logic comprises logic to generate the frame with the first traffic indication map segment bitmap in a traffic indication map information element, wherein the traffic indication map information element comprises the page bitmap in a page bitmap field. In some embodiments, the medium access control logic comprises logic to generate the frame with the traffic indication map element comprising a traffic indication map segment index, wherein the traffic indication map segment index indicates a index value for the first traffic indication map segment bitmap. And in some embodiments of the apparatus, the medium access control logic comprises logic to generate the frame with the first traffic indication map segment bitmap in a traffic indication map information element, wherein the traffic indication map information element comprises a block start value and a block range value.

Another example comprises a program product. The program product to generate a traffic indication map element may comprise a medium containing instructions to generate a frame to indicate whether data is buffered by an access point for associated stations, wherein the instructions, when executed by the access point, causes the access point to perform operations, the operations comprising: generating, by a medium access control logic, a frame comprising a first traffic indication map segment bitmap and a page bitmap, wherein the first traffic indication map segment comprises a first of more than one traffic indication map segment bitmaps for one page of a traffic indication map and the page bitmap comprises bits representative of blocks of client devices within the first traffic indication map segment bitmap.

Another example comprises a method. The method may involve receiving, by a client device, a frame comprising a first traffic indication map segment bitmap and a page bitmap, wherein the first traffic indication map segment bitmap comprises a first of more than one traffic indication map segment bitmaps for one page of a traffic indication map and the page bitmap comprises bits representative of blocks of client devices within the first traffic indication map segment bitmap; and decoding, by the client device, the page bitmap to determine whether the page bitmap indicates that an access point is buffering data for at least one station within a block, wherein the block comprises an association identifier assigned to the client device.

In some embodiments, the method may further comprise decoding, by the client device, a block start value and a block range value from a traffic indication map information element in the frame. In some embodiments, decoding the page bitmap comprises decoding a page bitmap element comprising the page bitmap, wherein the page bitmap comprises bits representative of all the blocks within the one page. In many embodiments, decoding the page bitmap comprises decoding a page bitmap element comprising the page bitmap, wherein the page bitmap comprises bits representative of only the blocks within the first traffic indication map segment bitmap. In some embodiments, decoding the page bitmap comprises decoding a traffic indication map information element, wherein the traffic indication map information element comprises the page bitmap in a page bitmap field. And, in some embodiments, decoding the traffic indication map information element comprises decoding a traffic indication map segment index, wherein the traffic indication map segment index indicates an index value for the first traffic indication map segment bitmap.

Another example comprises an apparatus. The apparatus may comprise a medium access control logic to receive a frame comprising a first traffic indication map segment bitmap and a page bitmap, wherein the first traffic indication map segment bitmap comprises a first of more than one traffic indication map segment bitmaps for one page of a traffic indication map and the page bitmap comprises bits representative of blocks of client devices within the first traffic indication map segment bitmap; and a physical layer logic coupled with the medium access control logic to receive and decode the frame.

In some embodiments, the apparatus further comprises a receiver coupled with the medium access control logic and an antenna to receive the frame. In some embodiments, the medium access control logic comprises logic to parse a traffic indication map information element, wherein the traffic indication map information element comprises the page bitmap in a page bitmap field. In some embodiments, the medium access control logic comprises logic to parse a block start value and a block range value from a traffic indication map information element in the frame. In several embodiments, the medium access control logic comprises logic to parse a page bitmap element comprising the page bitmap, wherein the page bitmap comprises bits representative of all the blocks within the one page. And, in some embodiments, the medium access control logic comprises logic to parse a page bitmap element comprising the page bitmap, wherein the page bitmap comprises bits representative of only the blocks within the first traffic indication map segment bitmap.

Another example comprises a program product. The program product to decode a traffic indication map element may comprise a medium containing instructions to interpret a frame indicative of whether data is buffered by an access point for associated stations, wherein the instructions, when executed by the access point, causes the access point to perform operations, the operations comprising: receiving a frame comprising a first traffic indication map segment bitmap and a page bitmap, wherein the first traffic indication map segment bitmap comprises a first of more than one traffic indication map segment bitmaps for one page of a traffic indication map and the page bitmap comprises bits representative of blocks of client devices within the first traffic indication map segment bitmap; and decoding the page bitmap to determine whether the page bitmap indicates that an access point is buffering data for at least one station within a block, wherein the block comprises an association identifier assigned to the client device.

In some embodiments of the program product, decoding the page bitmap comprises decoding a page bitmap element comprising the page bitmap, wherein the page bitmap comprises bits representative of all the blocks within the one page. In some embodiments of the program product, decoding the page bitmap comprises decoding a traffic indication map information element, wherein the traffic indication map information element comprises the page bitmap in a page bitmap field.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-5. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. An apparatus comprising:
one or more processor circuitry comprising:
logic to convert a communication signal into one or more protocol data units (PDUs);
logic to decode from the one or more PDUs information of a traffic indication mapping (TIM) element, wherein
the TIM element comprises a Page Index, a segment number, and a partial TIM bitmap,
the Page Index is to identify a page associated with the partial TIM bitmap,
the segment number is to identify a block portion within the page,
the block portion comprising at least a part of a block, and
the partial TIM bitmap to indicate one or more stations with buffered data at a remote device; and
logic to determine whether the partial TIM bitmap includes information corresponding to a station based at least in part on a value in the Page Index and a value in the segment number.

2. The apparatus of claim 1, wherein:
the station has a corresponding Association Identifier (AID); and
the logic to determine whether the partial TIM bitmap includes information corresponding to the station based at least in part on the value in the Page Index and the value in the segment number is to determine whether a bit associated with the AID is within the block portion.

3. The apparatus of claim 2, wherein the one or more processor circuitry comprise:
logic to selectively access the bit in the partial TIM bitmap in response to a determination that the partial TIM bitmap includes information corresponding to the station, the bit corresponding to the station.

4. The apparatus of claim 1, wherein the one or more processor circuitry comprise:
logic to cause entrance into operation mode to receive the TIM element; and
logic to cause entrance into sleep mode after receipt of the TIM element.

5. The apparatus of claim 1, wherein the TIM element is to be received in a beacon frame.

6. The apparatus of claim 1, wherein the one or more processor circuitry are part of a MAC sublayer device.

7. The apparatus of claim 1, wherein one or more of the logic to convert, the logic to decode, or the logic to determine comprises software executed by one or more processors.

8. The apparatus of claim 1, comprising:
a physical layer logic;
a radio communicatively coupled to the physical layer logic; and
at least one antenna communicatively coupled to the radio.

9. The apparatus of claim 8, comprising:
at least one memory communicatively coupled to the one or more processor circuitry and
a display communicatively coupled to the one or more processor circuitry.

10. At least one computer-readable non-transitory medium, comprising instructions stored thereon, which, if executed by one or more processors, cause the one or more processors to:
convert a communication signal into one or more protocol data units (PDUs);
decode from the one or more PDUs information of a traffic indication mapping (TIM) element, wherein
the TIM element comprises a Page Index, a segment number, and a partial TIM bitmap,
the Page Index is to identify a page associated with the partial TIM bitmap,
the segment number is to identify a block portion within the page,
the block portion comprising at least a part of a block, and
the partial TIM bitmap to indicate one or more stations with buffered data at a remote device; and
determine whether the partial TIM bitmap includes information corresponding to a station based at least in part on a value in the Page Index and a value in the segment number.

11. The at least one computer-readable non-transitory medium of claim 10, wherein:
the station has a corresponding Association Identifier (AID); and
the instructions to cause the one or more processors to determine whether the partial TIM bitmap includes information corresponding to the station based at least in part on the value in the Page Index and the value in the segment number are to cause the one or more processors to determine whether a bit associated with the AID is within the block portion.

12. The at least one computer-readable non-transitory medium of claim 11, comprising instructions stored thereon, which, if executed by the one or more processors, cause the one or more processors to:
selectively access the bit in the partial TIM bitmap in response to a determination that the partial TIM bitmap includes information corresponding to the station, the bit corresponding to the station.

13. The at least one computer-readable non-transitory medium of claim 10, comprising instructions stored thereon, which, if executed by the one or more processors, cause the one or more processors to:
cause entrance into operation mode to receive the TIM element; and
cause entrance into sleep mode after receipt of the TIM element.

14. The at least one computer-readable non-transitory medium of claim 10, wherein the TIM element is to be received in a beacon frame.

15. A computer-implemented method comprising:
converting a communication signal into one or more protocol data units (PDUs);
decoding from the one or more PDUs information of a traffic indication mapping (TIM) element, wherein
  the TIM element comprises a Page Index, a segment number, and a partial TIM bitmap,
  the Page Index is to identify a page associated with the partial TIM bitmap,
  the segment number is to identify a block portion within the page,
  the block portion comprising at least a part of a block, and
  the partial TIM bitmap to indicate one or more stations with buffered data at a remote device; and
determining whether the partial TIM bitmap includes information corresponding to a station based at least in part on a value in the Page Index and a value in the segment number.

16. The method of claim 15, wherein:
the station has a corresponding Association Identifier (AID); and
determining whether the partial TIM bitmap includes information corresponding to the station based at least in part on the value in the Page Index and the value in the segment number comprises determining whether a bit associated with the AID is within the block portion.

17. The method of claim 16, comprising:
selectively accessing the bit in the partial TIM bitmap in response to a determination that the partial TIM bitmap includes information corresponding to the station, the bit corresponding to the station.

18. The method of claim 15, comprising:
causing entrance into operation mode to receive the TIM element and
causing entrance into sleep mode after receipt of the TIM element.

19. The method of claim 15, comprising:
receiving the TIM element in a beacon frame.

20. An apparatus comprising:
one or more processor circuitry comprising:
  logic to form a frame comprising a Page Index field, a segment number field, and a partial traffic indication mapping (TIM) bitmap, wherein
    the Page Index field is to identify a page associated with the partial TIM bitmap,
    the segment number field is to identify a block portion within the page,
    the block portion comprising at least a part of a block, and
    the partial TIM bitmap to indicate one or more remote stations with buffered data; and
  logic to trigger encapsulating the frame in a protocol data unit (PDU), converting the PDU into a communication signal, and transmitting the communication signal.

21. The apparatus of claim 20, wherein the one or more processor circuitry comprise:
logic to form a TIM element, the TIM element to include the Page Index field, the segment number field, and the partial TIM bitmap; and
logic to form the TIM element as part of a beacon frame.

22. The apparatus of claim 20, wherein the one or more processor circuitry comprise:
logic to cause transmission of buffered data in response to a request from a remote station.

23. The apparatus of claim 20, wherein the one or more processor circuitry are part of a MAC sublayer device.

24. The apparatus of claim 20, wherein at least the logic to form the frame comprises software executed by one or more processors.

25. The apparatus of claim 20, comprising:
a physical layer logic;
a radio communicatively coupled to the physical layer logic; and
at least one antenna communicatively coupled to the radio.

26. At least one computer-readable non-transitory medium, comprising instructions stored thereon, which, if executed by one or more processors, cause the one or more processors to:
form a frame comprising a Page Index field, a segment number field, and a partial traffic indication mapping (TIM) bitmap, wherein
  the Page Index field is to identify a page associated with the partial TIM bitmap,
  the segment number field is to identify a block portion within the page,
  the block portion comprising at least a part of a block, and
  the partial TIM bitmap to indicate one or more remote stations with buffered data; and
trigger encapsulating the frame in a protocol data unit (PDU), converting the PDU into a communication signal, and transmitting the communication signal.

27. The at least one computer-readable non-transitory medium of claim 26, comprising instructions stored thereon, which, if executed by the one or more processors, cause the one or more processors to:
form a TIM element, the TIM element to include the Page Index field, the segment number field, and the partial TIM bitmap; and
form the TIM element as part of a beacon frame.

28. The at least one computer-readable non-transitory medium of claim 26, comprising instructions stored thereon, which, if executed by the one or more processors, cause the one or more processors to:
cause transmission of buffered data in response to a request from a remote station.

29. A computer-implemented method comprising:
forming a frame comprising a Page Index field, a segment number field, and a partial traffic indication mapping (TIM) bitmap, wherein
  the Page Index field is to identify a page associated with the partial TIM bitmap,
  the segment number field is to identify a block portion within the page,
  the block portion comprising at least a part of a block, and
  the partial TIM bitmap to indicate one or more remote stations with buffered data; and
triggering encapsulating the frame in a protocol data unit (PDU), converting the PDU into a communication signal, and transmitting the communication signal.

30. The method of claim 29, comprising:
forming a TIM element, the TIM element to include the Page Index field, the segment number field, and the partial TIM bitmap; and
forming the TIM element as part of a beacon frame.

31. The method of claim 29, comprising:
transmitting buffered data in response to a request from a remote station.

* * * * *